(12) United States Patent
Smits et al.

(10) Patent No.: US 12,246,504 B2
(45) Date of Patent: Mar. 11, 2025

(54) STRIP APPLICATOR, STRIP-WINDING STATION AND METHOD FOR APPLYING A STRIP TO A STRIP-WINDING DRUM

(71) Applicant: VMI Holland B.V., Epe (NL)

(72) Inventors: Marcel Smits, Epe (NL); Gerardus Johannes Catharina Van Laar, Epe (NL); Gerrit Mulder, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 18/686,695

(22) PCT Filed: Aug. 26, 2022

(86) PCT No.: PCT/NL2022/050488
§ 371 (c)(1),
(2) Date: Feb. 26, 2024

(87) PCT Pub. No.: WO2023/027587
PCT Pub. Date: Mar. 2, 2023

(65) Prior Publication Data
US 2024/0375365 A1    Nov. 14, 2024

(30) Foreign Application Priority Data

Aug. 26, 2021 (NL) ..................................... 2029062

(51) Int. Cl.
*B29D 30/30*   (2006.01)
*B29D 30/00*   (2006.01)

(52) U.S. Cl.
CPC .. *B29D 30/3028* (2013.01); *B29D 2030/0038* (2013.01); *B29D 2030/3064* (2013.01)

(58) Field of Classification Search
None
See application file for complete search history.

(56) References Cited

U.S. PATENT DOCUMENTS

| 10,343,360 B2 | 7/2019 | Otani ..................... B29D 30/30 |
| 10,421,242 B2 | 9/2019 | Nakamura ............. B29D 30/60 |

(Continued)

FOREIGN PATENT DOCUMENTS

| CN | 110422666 | 11/2019 | ............. B65H 18/10 |
| EP | 2199071 | 6/2010 | ............. B29D 30/60 |

(Continued)

OTHER PUBLICATIONS

Dutch Search Report issued in NL Patent Appln. No. 2029062, dated May 6, 2022, 9 pgs.

(Continued)

*Primary Examiner* — Jacob T Minskey
*Assistant Examiner* — Adrien J Bernard
(74) *Attorney, Agent, or Firm* — HAYES SOLOWAY P.C.

(57) ABSTRACT

Disclosed is a strip applicator, a strip-winding station and method for applying a strip to a strip-winding drum, wherein the strip applicator includes an applicator member applying the strip to the strip-winding drum at an application position and a supply section receiving the strip in an input direction at a supply position and supplying the strip to the applicator member in an output direction. The applicator member is movable in an offset direction transverse to the output direction to offset the application position relative to the supply position. The supply section has an input member at the supply position for receiving the strip in the input direction and an output member for outputting the strip to the applicator member in the output direction. The output member is movable relative to the input member from a start position towards an offset position in the offset direction.

35 Claims, 9 Drawing Sheets

(56) References Cited

U.S. PATENT DOCUMENTS

| | | | |
|---|---|---|---|
| 2006/0081325 A1 | 4/2006 | Hayashi et al. | |
| 2007/0102088 A1* | 5/2007 | Hayashi | B60C 11/01 |
| | | | 152/532 |
| 2008/0251185 A1 | 10/2008 | Cappa et al. | |
| 2009/0126846 A1 | 5/2009 | Tada | B60C 9/20 |
| 2011/0005660 A1 | 1/2011 | Ogawa | B29D 30/60 |
| 2014/0231024 A1 | 8/2014 | Eidelberg et al. | B29D 30/16 |
| 2015/0083307 A1* | 3/2015 | Slot | B29D 30/48 |
| | | | 156/135 |
| 2016/0368232 A1* | 12/2016 | Araki | B29D 30/14 |
| 2022/0219417 A1* | 7/2022 | Schiavon | B29D 30/3028 |

FOREIGN PATENT DOCUMENTS

| | | | |
|---|---|---|---|
| EP | 3106292 | 12/2016 | B29D 30/60 |
| JP | 2008260296 | 10/2008 | |
| JP | 2011189678 | 9/2011 | B29D 30/08 |
| JP | 2013022871 | 2/2013 | |
| JP | 2014124929 | 7/2014 | B29D 30/60 |
| JP | 2015157404 | 9/2015 | B29D 30/60 |
| JP | 2020093411 | 6/2020 | B29D 30/60 |
| KR | 10-0635023 | 10/2006 | |
| LU | 87565 | 10/1989 | B29D 30/60 |
| WO | WO2009031435 | 3/2009 | B29D 30/60 |

OTHER PUBLICATIONS

International Search Report and Written Opinion issued in WO Patent Appln. No. PCT/NL2022/050488, dated Nov. 10, 2022, 10 pgs.

International Preliminary Report on Patentability issued in WO Patent Appln. No. PCT/NL2022/050488, dated Feb. 27, 2024, 6 pgs.

Japanese Office Action issued in JP Patent Appln. No. 2022571739, dated Mar. 11, 2024, with machine English translation, 11 pgs.

Decision to Grant issued in related Japanese Application Serial No. 2022-571739, dated Sep. 17, 2024, with translation, 5 pages.

* cited by examiner

STRIP APPLICATOR, STRIP-WINDING STATION AND METHOD FOR APPLYING A STRIP TO A STRIP-WINDING DRUM

BACKGROUND

The invention relates to a strip applicator, a strip-winding station and a method for applying a strip to a strip-winding drum.

A method is known for applying a strip to a strip-winding drum, in which a strip applicator supplies a strip to the strip-winding drum while the strip-winding drum is being rotated about a drum axis to collect several windings of the strip around its circumference that ultimately form a tire component. Each winding extends in a plane perpendicular to the drum axis, except for a small transition area at the end of each winding in which the strip-winding drum is briefly moved relative to the strip applicator in an axial direction parallel to the drum axis to transition the strip from one winding into the next winding. During the transition, the strip-winding drum continues to rotate about the drum axis.

Alternatively, in US 2009/126846 A1, the supply means, i.e. an extruder, is moved in its entirety relative to the drum to obtain an inclined region that marks the transition from one winding to the next.

SUMMARY OF THE INVENTION

A disadvantage of moving the strip-winding drum is that it is relatively heavy and unable to accelerate and decelerate fast enough in the axial direction. Moving the supply means is not a good alternative, because the extruder is relatively heavy as well. Moreover, the supply infrastructure upstream of a drum often comprises more than just the extruder. In particular, the supply infrastructure may further comprise raw material infeed means, buffers, festooners, dancer rollers, associated electronics, etc. When moving the extruder, the entire supply infrastructure has to move with it.

When the strip-winding drum or the supply means move too slow, the transition area will be relatively big. This may hurt the uniformity and/or consistency of the tire component to be formed, in particular in the first winding and the last winding where such a transition area will leave a gap in the side edge of the tire component to be formed. To keep the transition area and any gaps as small as possible, out of necessity, the rotation of the strip-winding drum about the drum axis is reduced. This measure however considerably increases the cycle time of the strip-winding process.

It is an object of the present invention to provide a strip applicator, a strip-winding station and a method for applying a strip to a strip-winding drum, wherein the consistency and/or uniformity of the tire component to be formed can be improved.

According to a first aspect, the invention provides a strip applicator for applying a strip to a strip-winding drum, wherein the strip applicator comprises an applicator member for applying the strip to the strip-winding drum at an application position and a supply section for receiving the strip in an input direction at a supply position and for supplying the strip to the applicator member in an output direction, wherein the applicator member is movable in an offset direction transverse to the output direction to offset the application position relative to the supply position, wherein the supply section comprises an input member at the supply position for receiving the strip in the input direction and an output member for outputting the strip to the applicator member in the output direction, wherein the output member is movable relative to the input member from a start position towards an offset position with at least a vector component in the offset direction.

By creating an offset between the input member and the output member, the supply infrastructure upstream of the input member can be kept in place while the rest of the supply section can follow the movement of the applicator member in the offset direction. As a result, the mass and/or complexity of the supply infrastructure does not compromise the ability of the supply section to follow the applicator member. In particular, the applicator member and the output member can be designed with relatively low inertia and can thus be accelerated and decelerated quickly to keep the transition area between the windings as small as possible. Consequently, the consistency and/or uniformity of the tire component to be formed can be improved.

In a preferred embodiment the output member is arranged to remain aligned or substantially aligned with the applicator member in the output direction when the output member is moved from the start position towards the offset position. In other words, the output member and the applicator member are synchronously movable in the offset direction. Hence, the part of the strip extending between the output member and the applicator member can be kept aligned with or parallel to the output direction. In other words, the output direction can be kept the same during the movement of the output member and the applicator member in the offset direction.

In another embodiment the strip applicator comprises an applicator holder for holding the applicator member, wherein the supply section comprises a supply holder for holding the output member, wherein the applicator holder and the supply holder are mechanically interconnected to synchronize the movements of the applicator member and the output member in the offset direction. By mechanically interconnecting said holders, i.e. integrally or with a connecting frame or connecting member, the movements of the holders in the offset direction can be reliably synchronized and, therefore, the movements of the applicator member and the output member in the offset direction can be reliably synchronized. More in particular, both the applicator member and the output member can be moved synchronously using a single drive.

In a further embodiment the supply section defines a supply path for the strip, wherein the supply path, between the input member and the output member, comprises a transition segment that extends in a start orientation transverse to the output direction and the offset direction when the output member is in the start position and that is tilted into an offset orientation oblique to the start orientation when the output member is in the offset position. In the oblique offset orientation, the transition segment can bridge the gap in the offset direction between the input member and the output member.

Preferably, the transition segment extends in a transition direction transverse or perpendicular to the offset direction and the output direction in the start orientation. Hence, when tilting the transition segment, the strip travelling along said transition segment can be transferred from the input member towards the output member in the transition direction having an increasing component in the offset direction.

In a further embodiment thereof the transition segment is tiltable about a first twist axis parallel or substantially parallel to the input direction. Preferably, the input member comprises a roller body with a circumferential surface, wherein the first twist axis is tangent to the circumferential surface of the roller body of the input member. More preferably, the input member is arranged for receiving the strip in the input direction along an input path, wherein the first twist axis coincides or substantially coincides with the input path. The tilting of the transition segment about the first twist axis predominantly subjects the strip to torsion about the first twist axis along the input path, i.e. about the longitudinal axis of the strip. More in particular, stretching or compression of the strip at one of its longitudinal sides can be prevented.

In a further embodiment the output member comprises a roller body with a circumferential surface and wherein the applicator member comprises a roller body with a circumferential surface, wherein the output member is tiltable relative to the applicator member about a second twist axis tangent to the circumferential surface of the output member and the circumferential surface of the applicator member. Hence, to facilitate the offset of the output member in the offset direction, the part of the strip travelling between the output member and the applicator member is predominantly subjected to torsion about the second twist axis, i.e. about the longitudinal axis of the strip. More in particular, stretching or compression of the strip at one of its longitudinal sides can be prevented.

In a further embodiment the input member and the output member are tiltable as a whole about the first twist axis. The input member can thus follow the tilt of the output member and remain in the same orientation relative to the output member. Consequently, the part of the strip extending along the transition segment between the input member and the output member can be kept in a substantially constant state, i.e. without twisting or bending, during the tilting of the input member and the output member.

Preferably, the supply section comprises a supply holder for holding the input member and the output member relative to the first twist axis, wherein the supply holder, the input member and the output member are tiltable as a whole about the first twist axis. Hence, the input member and the output member can be supported by a common holder, thus eliminating the need for individually supporting and/or moving the input member and the output member.

More preferably, the supply holder comprises a first holder part holding the input member and a second holder part holding the output member, wherein the second holder part is movable with respect to the first holder part in an extension direction to move the input member and the output member away from each other. When solely tilting the output member about the first twist axis, the output member will travel a circular trajectory with a vector component in the offset direction. In this particular embodiment, the output member can be simultaneously moved in the extension direction to at least partially compensate for the circular trajectory. Hence, the output member can follow a more or less linear path in the offset direction despite the tilting about the first twist axis.

More preferably, the second holder part is telescopically movable with respect to the first holder part in said extension direction. The second holder part can thus be partially accommodated in the first holder part.

Additionally or alternatively, the extension direction extends perpendicular or transverse to the first twist axis. Hence, the extension of the second holder part in the extension direction can add a radial component to the tilt of the output member about the first twist axis.

In an alternative embodiment the supply section comprises a first diversion member for receiving the strip from the input member and a second diversion member for feeding the strip towards the output member, wherein the transition segment is defined between the first diversion member and the second diversion member. Preferably, first diversion member is located at a side of the input member facing away from the output member and/or wherein the second diversion member is located at a side of the output member facing away from the input member. The diversion members can initially deflect the strip in a direction other than the transition direction of the transition segment, for example to provide a considerably longer transition segment. When the transition segment is longer, the transition segment can be tilted into the oblique offset orientation over a relatively small angle to achieve the same offset of the output member in the offset direction compared to a shorter transition segment.

In a further embodiment the input member comprises a roller body with a circumferential surface that is rotatable about an input axis and wherein the first diversion member comprises a roller body with a circumferential surface that is rotatable about a first diversion axis transverse or perpendicular to the input axis. The strip can be twisted over approximately ninety degrees between the input member and the first diversion member to optimally position the strip prior to entering the transition segment. In particular, the strip can be arranged with its flat side around the first diversion member to prevent stretching or compression of its longitudinal edges.

Preferably, the output member comprises a roller body with a circumferential surface that is rotatable about an output axis and wherein the second diversion member comprises a roller body with a circumferential surface that is rotatable about a second diversion axis transverse or perpendicular to the output axis. The strip can thus be twisted back over approximately ninety degrees between the second diversion member and the output member to return the strip into its original orientation after leaving the transition segment.

More preferably, the first diversion axis and the second diversion axis are parallel or substantially parallel to each other. Hence, the strip can be kept in the same or substantially the same orientation while travelling through the transition segment.

In a further embodiment the first diversion member comprises a roller body with a circumferential surface that is rotatable about a first diversion axis, wherein the transition segment is tiltable about the first diversion axis. Tilting the transition segment over the full length between the first diversion member and the second diversion member has the advantage that the arcuate movement of the second diversion member over a small angle is almost linear, i.e. predominantly in the offset direction.

In a further embodiment the second diversion member and the output member are linearly movable in the offset direction. The strip may be stretched slightly as a result of the linear movement instead of a tilt about the first diversion axis. However, if the transition segment is long enough and/or if the angle is sufficiently small, the amount of stretching will be insignificant.

In another embodiment the input member comprises a roller body with a circumferential surface that is rotatable about an input axis and wherein the output member comprises a roller body with a circumferential surface that is rotatable about an output axis parallel to the input axis. The strip can thus be fed into the supply section and fed out of the supply section in the same or substantially the same orientation relative to the input axis and the output axis, respectively.

In another embodiment the input direction and the output direction are parallel or substantially parallel. The strip can therefore exit the supply section in the same or substantially the same direction in which it entered the supply section.

In another embodiment the applicator member is linearly movable in the offset direction. In other words, the movement of the applicator member is a purely linear motion, i.e. without any vector component in another direction than the offset direction.

In another embodiment the applicator member comprises a roller body with a circumferential surface that is rotatable about an applicator axis, wherein the orientation of the applicator axis remains fixed during the movement of the applicator member in the offset direction. Hence, the applicator member does not contribute to any steering of the strip, other than that it is moved in the offset direction.

According to a second aspect, the invention provides a strip-winding station comprising the strip applicator according to any one of the embodiments of the first aspect of the invention and a strip-winding drum.

The strip-winding station thus has the same technical advantages as the strip applicator according to the first aspect of the invention, which will not be repeated hereafter.

Preferably, the strip-winding drum is rotatable about a drum axis, wherein the offset direction is parallel or substantially parallel to the drum axis. Hence, the applicator member can be moved across the drum in the offset direction parallel to the drum axis.

In a further embodiment the applicator member comprises a roller body with a circumferential surface that is rotatable about an applicator axis, wherein the applicator member is rotatable about a steering axis transverse to the applicator axis between a neutral orientation in which the applicator axis extends parallel to the drum axis and a steering orientation in which the applicator axis extends at a steering angle oblique to the drum axis. The steering angle may be set prior to winding or the steering angle may be varied during winding. The steering angle can be used to steer the strip in into and out of the transition area between the windings. Alternatively or additionally, the steering angle can be used during the application of the windings themselves to exert a sideways force onto the strip. Such a sideways force can smoothen the material of the subsequent windings and/or allow for a closer or tighter side-by-side arrangement of the windings.

According to a third aspect, the invention provides a method for applying a strip to a strip-winding drum using the strip applicator according to any one of the embodiments of the first aspect of the invention, wherein the method comprises the steps of:
  receiving the strip in the input direction into the supply section at the supply position;
  supplying the strip from the supply section to the applicator member in the output direction;
  applying the strip to the strip-winding drum at the application position by winding the strip around the strip-winding drum over two or more windings;
  moving the applicator member in an offset direction transverse to the output direction to offset the application position relative to the supply position; and
  moving the output member relative to the input member from a start position towards an offset position with at least a vector component in the offset direction.

The method relates to the practical implementation of the strip-applicator according to the first aspect of the invention and thus has the same technical advantages, which will not be repeated hereafter.

Preferably, the output member remains aligned or substantially aligned with the applicator member in the output direction when the output member is moved from the start position towards the offset position.

In a further embodiment the output member and the applicator member move synchronously in the offset direction.

In a further embodiment the strip is subjected to a torsion in a position between the output member and the applicator member as a result of moving the output member in the offset direction. Hence, to facilitate the offset of the output member in the offset direction, the part of the strip travelling between the output member and the applicator member is predominantly subjected to torsion about the second twist axis, i.e. about the longitudinal axis of the strip. More in particular, stretching or compression of the strip at one of its longitudinal sides can be prevented.

Preferably, the strip is subjected to a torsion opposite to the torsion between the output member and the applicator member in a position upstream of the input member with respect to the input direction. Hence, the strip can already be positioned optimally for the offset movement in the supply section prior to entering the supply section and can be returned to the original orientation after leaving the supply section.

In a further embodiment the strip is subjected to opposite torsions in two spaced apart positions between the input member and the output member. Because of the opposite torsions between the input member and the output member, the strip can enter and exit the supply section in the same or substantially the same orientation, while the strip can be positioned optimally for the movement in the offset direction between the two spaced apart positions within the supply section.

In a further embodiment the applicator member comprises a roller body with a circumferential surface that is rotatable about an applicator axis, wherein the method further comprises the step of rotating the applicator member about a steering axis transverse to the applicator axis between a neutral orientation in which the applicator axis extends parallel to the drum axis and a steering orientation in which the applicator axis extends at a steering angle oblique to the drum axis.

In a further embodiment the method further comprises the steps of:
  moving the strip-winding drum in the offset direction; and
  simultaneously returning the applicator member and the output member in a return direction opposite to the offset direction. After returning the applicator member and the output member to their respective start positions, the steps of the aforementioned method can be repeated for a next transition between windings.

In a further embodiment the applicator member is moved in the offset direction at an offset speed in a ratio to a rotation speed of the strip-winding drum about the drum axis, wherein the method further comprises the step of:
  varying the ratio for subsequent pairs of windings of the strip. The transition areas between the subsequent pairs of windings can thus be optimized for tire component uniformity. In particular, the gaps in the outer windings, i.e. at the lateral sides of the tire component, can be reduced.

The various aspects and features described and shown in the specification can be applied, individually, wherever possible. These individual aspects, in particular the aspects and features described in the attached dependent claims, can be made subject of divisional patent applications.

In particular, it is observed that the variable ratio discussed in the last embodiment can also be applied independently of the strip applicator according to the first aspect of the invention, i.e. by only controlling the applicator member in accordance with the drawings and the description below, without any other limitations of the strip applicator.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
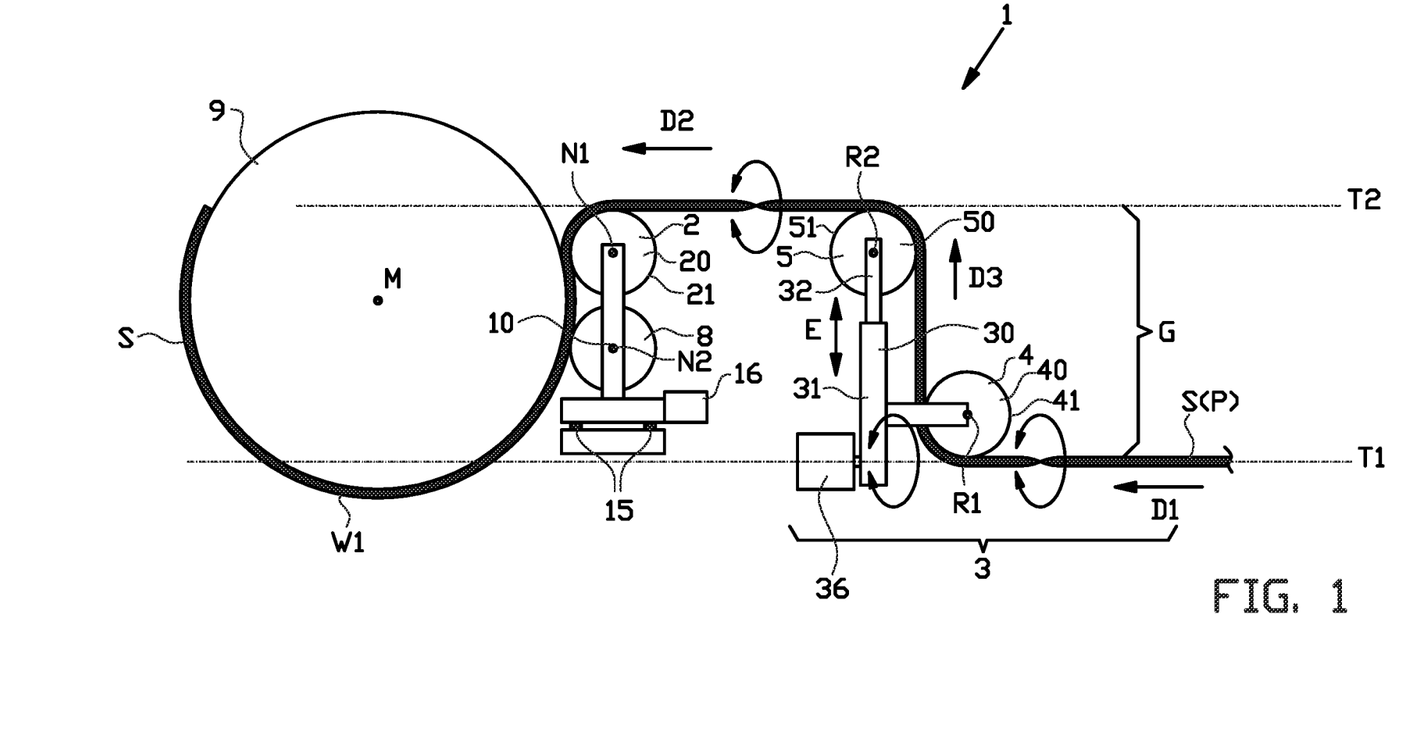
FIG. 1 shows a side view of a strip-winding station comprising a strip applicator according to a first exemplary embodiment of the invention.

FIG. 1 show a strip-winding station 100 comprising a strip-winding drum 9 and a strip applicator 1 according to a first exemplary embodiment of the invention for applying a strip S to the strip-winding drum 9. The strip S is wound over a plurality of windings to form a tire component (not shown) for a green or unvulcanized tire. The strip S may be arranged in one or more layers, each layer comprising several side-by-side windings.

The strip S as shown in FIGS. 1-4 is schematically represented as thick line with no specific cross-sectional shape, width or height. In reality, the strip S may have a thin, flat and/or rectangular cross section, i.e. having a strip width that is greater than the strip height. As such, the strip S has longitudinal sides or edges in its width direction and a top and bottom surface facing away from each other in the height direction. It will be understood that the strip S is guided through the strip applicator 1 with its top or bottom surface facing the guide surfaces or circumferential surfaces of the respective members and, more in particular, in an orientation with the aforementioned top or bottom surface of the strip extending parallel or substantially parallel to said guide surfaces or circumferential surfaces, described in more detail hereafter.

Moreover, twists and/or torsions in the strip S are schematically represented to occur within a relatively short length of the strip S. It will however be understood that such a twist or torsion can be more gradual and may extend over a longer length, i.e. over a considerable part or the entire length of the strip S between two consecutive members of the strip applicator 1.

Figure 2:
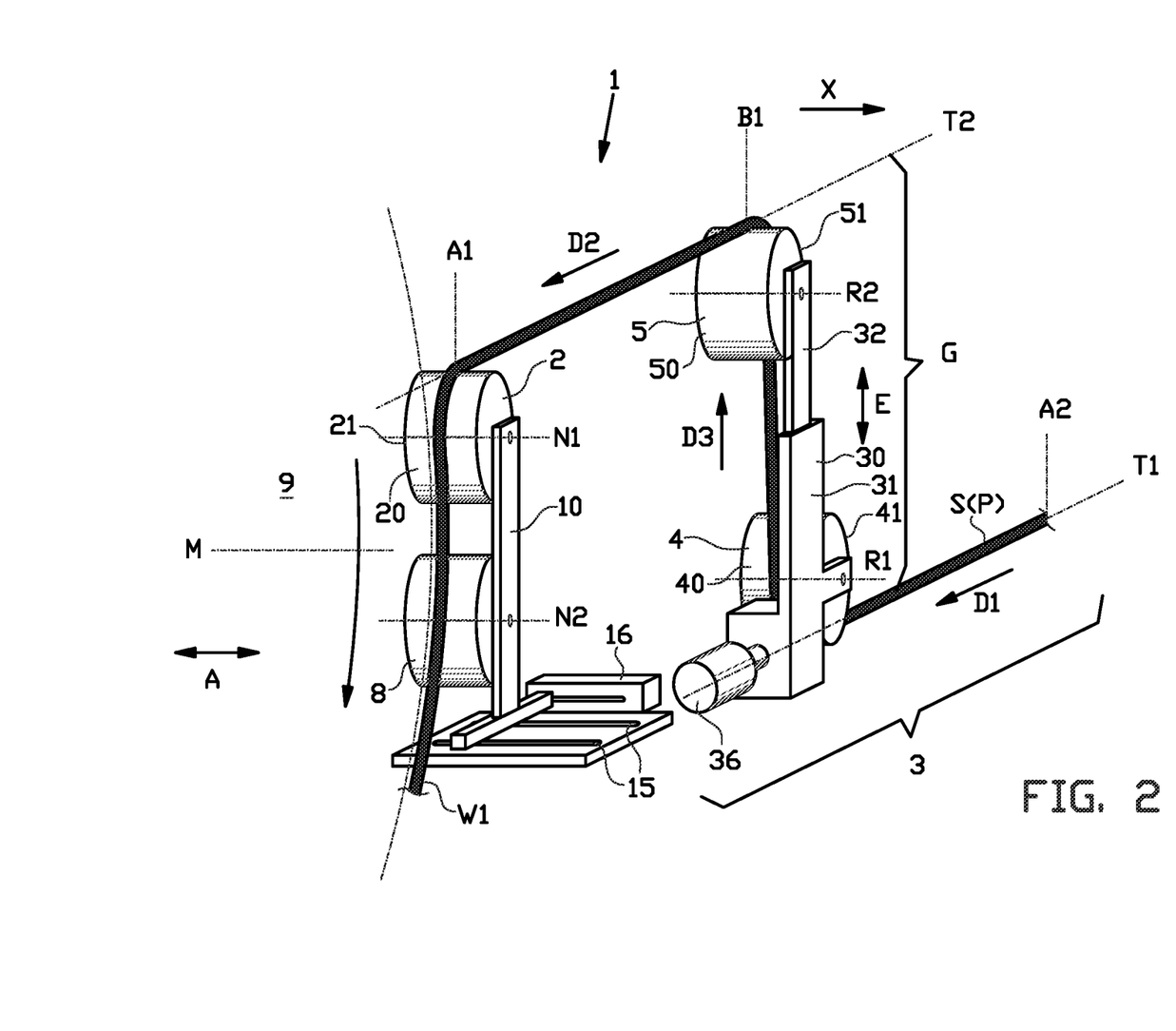
FIGS. 2, 3 and 4 show isometric views of the strip applicator according to FIG. 1, during three subsequent stages of strip-winding.
Figure 3:
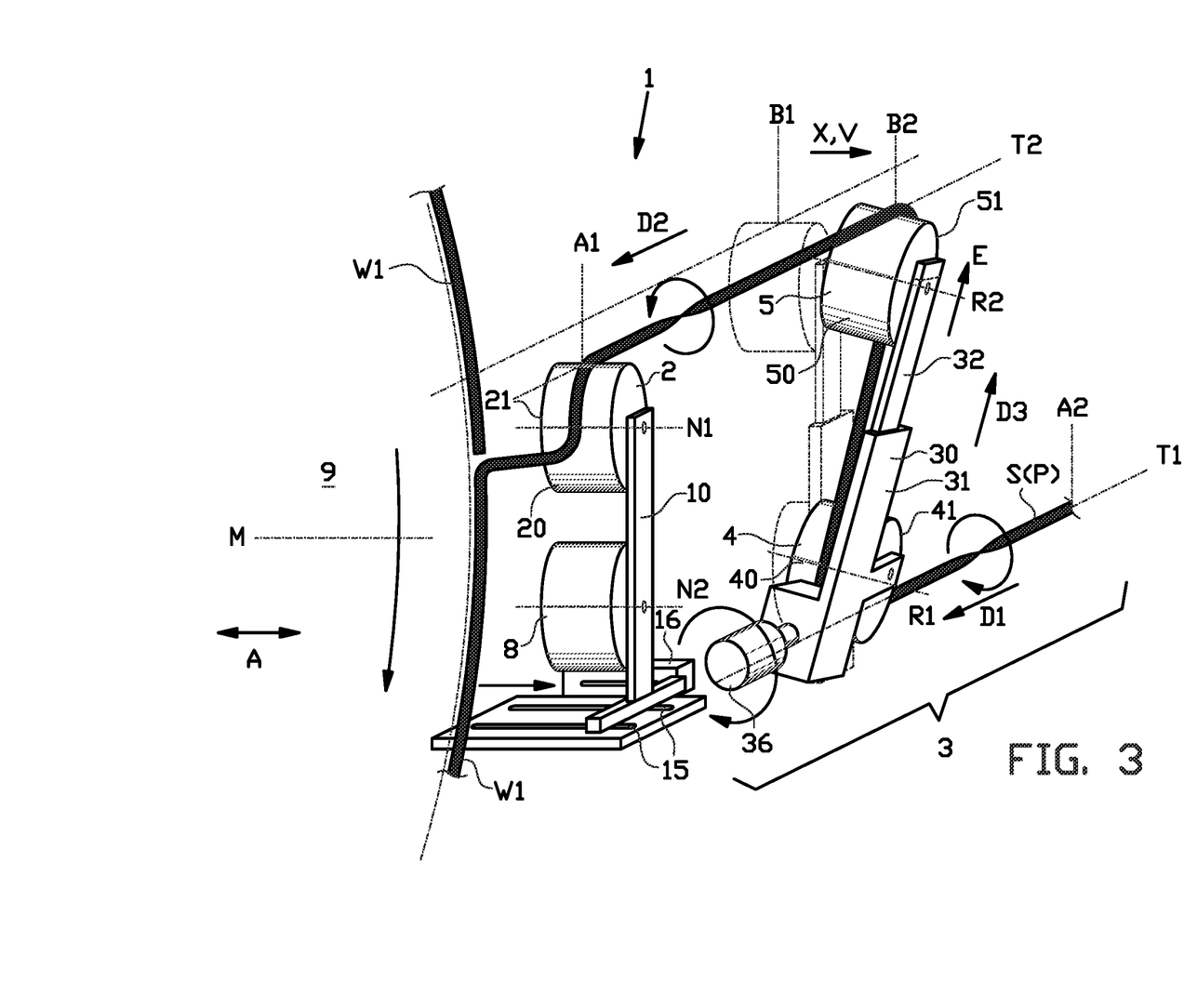
Figure 4:
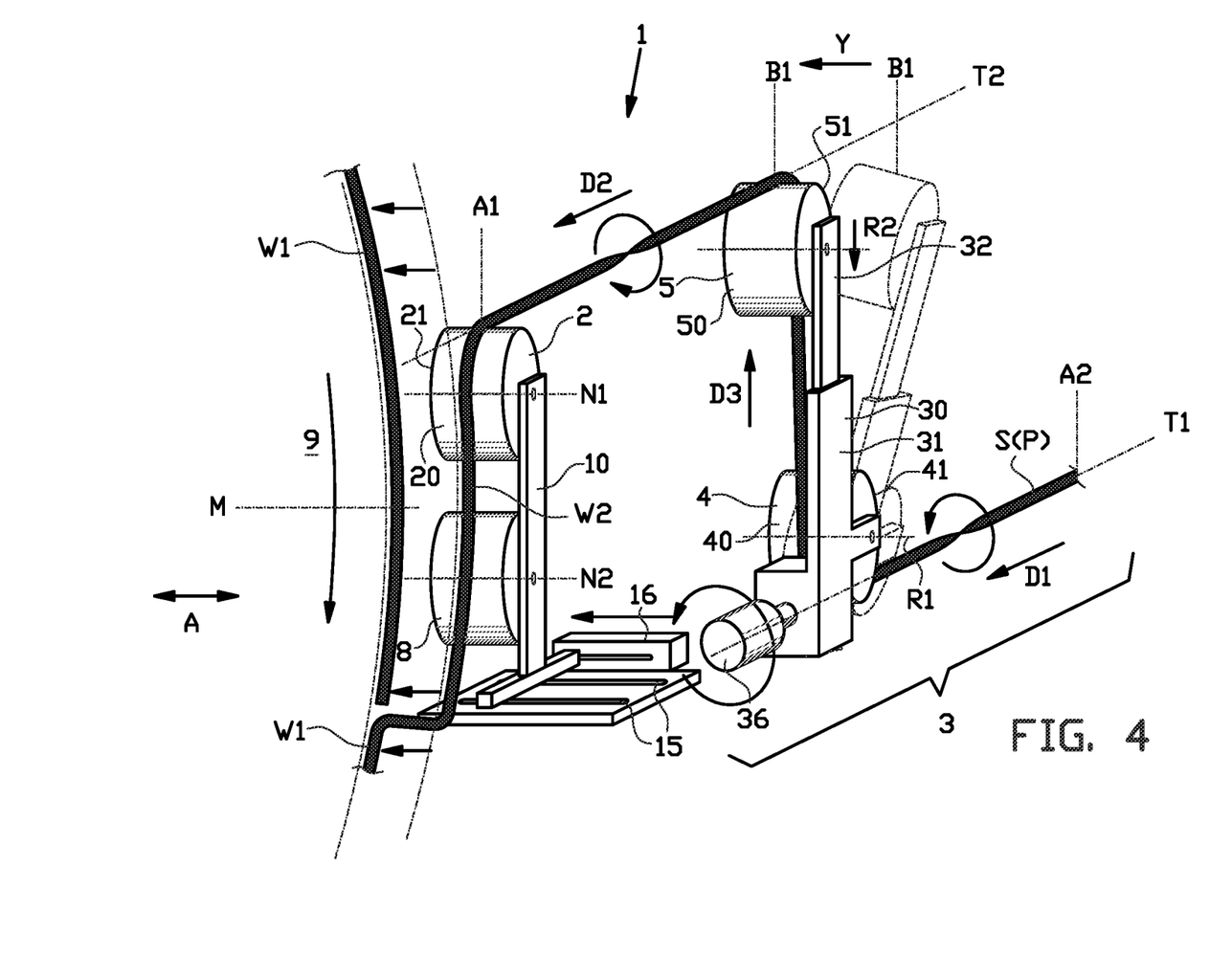

The strip S travels along a supply path P defined by the strip applicator 1 and is ultimately wound on the circumferential drum surface of the strip winding drum 9, which is only schematically show in dashed lines in FIGS. 2-4.

The strip-winding drum 9 has a circumferential drum surface for receiving the strip S from the strip applicator 1. The strip-winding drum 9 is rotatable about a drum axis M, concentric to the circumferential drum surface. The strip-winding station 100 is configured for providing a relative movement between the strip-winding drum 9 and the strip applicator 1 to allow for the strip S to be applied across the circumferential drum surface in an axial direction A parallel to the drum axis M. In this exemplary embodiment, the strip-winding drum 9 is movable in the axial direction A parallel to the drum axis M.

As shown in more detail in FIGS. 2, 3 and 4, the strip applicator 1 comprises an applicator member 2 for applying the strip to the strip-winding drum 9 at an application position A1 in the axial direction A. In this exemplary embodiment, the applicator member 2 is an applicator roller comprising a roller body 20. The roller body 20 has or defines a circumferential surface 21 that is rotatable about an applicator axis N1. In this exemplary embodiment, the applicator axis N1 is parallel or substantially parallel to the drum axis M and remains in a fixed orientation relative to said drum axis M.

The strip applicator 1 further comprises a stitch member 8 for stitching the strip S after said strip S has been applied by applicator member 2 to the strip-winding drum 9. The stitch member 8 is rotatable about a stitch axis N2 parallel or substantially parallel to the applicator axis N1.

The strip applicator 1 is provided with an applicator frame or holder 10 for holding the applicator member 2 relative to the strip-winding drum 9 and an applicator guide 15 for moving the applicator holder 10 in an offset direction X. The application position A1 moves or is offset together with the applicator member 2 in the offset direction X. Preferably, the offset direction X is parallel or substantially parallel to the drum axis M and/or the axial direction A. In this exemplary embodiment, the stitch member 8 is also held by the applicator holder 10. In other words, the applicator holder 10 acts as a common support for both the applicator member 2 and the stitch member 8. In this example, the applicator member 2 is moved linearly in the offset direction X, i.e. without a component in another direction than the offset direction X. In particular, the strip applicator 1 comprises an applicator drive 16, i.e. a linear drive, for actively driving and/or controlling the movement of the applicator holder 10 in the offset direction X.

As shown in FIGS. 2, 3 and 4, the strip applicator 1 comprises a supply section 3 for receiving the strip S from an upstream station (not shown). Said upstream station may for example be an extruder that feeds the strip S directly into the supply section 3 of the strip applicator 1. Alternatively, the upstream station may comprise one or more conveyors, buffer members, storage members or the like, i.e. a dancer roller and/or a festooner, to buffer the strip S between the extruder and the strip applicator 1. The supply section 3 is arranged for receiving the strip S at a supply position A2 in the axial direction A. Preferably, the supply position A2 is fixed or stationary in the axial direction A during strip-winding. The strip applicator 1 is arranged for receiving the strip S along a supply path extending in a supply direction D1 into the supply section 3. In this exemplary embodiment, the supply direction D1 is transverse or perpendicular to the offset direction X, the drum axis M and/or the axial direction A. Preferably, the supply direction D1 is horizontal or substantially horizontal.

The supply section 3 is configured for supplying the strip S to the applicator member 2 along an output path extending in an output direction D2. The output direction D2 is transverse or perpendicular to the offset direction X, the drum axis M and/or the axial direction A. In this exemplary embodiment, the output direction D2 is parallel or substantially parallel to the input direction D1. The input path and the output path are parallel or substantially parallel, yet spaced apart.

The supply section 3 comprises an input member 4 and an output member 5 which together define a transition segment G within the supply path P of the strip S, extending in a transition direction D3 transverse or perpendicular to the input direction D1, the output direction D2 and/or the offset direction X. The input member 4 is located at or near, in-line or substantially in-line with the supply position A2 in the input direction D1 for receiving the strip S in said input direction D1. In this exemplary embodiment, the input member 4 comprises a roller body 40 with a circumferential surface 41 that is rotatable about an input axis R1. The input member 4 is configured to remain in the fixed or stationary input position A1 during strip-winding.

Like the input member 4, the output member 5 comprises a roller body 50 with a circumferential surface 51 that is rotatable about an output axis R2. In this exemplary embodiment, the input axis R1 and the output axis R2 are parallel or substantially parallel to each other.

Comparing FIGS. 2 and 3, it can be seen that the output member 5 is movable relative to the input member 4 from a start position B1, as shown in FIG. 2, towards an offset position B2, as shown in FIG. 3, in the offset direction X, or with (at least) a vector component V in the offset direction X. In other words, the output member 5 is arranged to follow the applicator member 2 as it moves in the offset direction X. Hence, the output member 5 or remains in-line or substantially in-line with the applicator member 2 in the output direction D2. Preferably, the output member 5 and the applicator member 2 are moved synchronously in the offset direction X. This allows for the strip S to be outputted from the supply section 3 in the same output direction D2 regardless of the offset of the applicator member 2 in the offset direction X.

In this example, the supply section 3 comprises a supply frame or holder 30 for holding the input member 4 and the output member 5 relative to each other and a supply drive 36 for rotating or tilting the supply holder 30 about a first twist axis T1. The first twist axis T1 is parallel or substantially parallel to the input direction D1 and/or perpendicular to the offset direction X. When said supply holder 30 is tilted, the input member 4 and the output member 5 supported by said supply holder 30 are tilted as a whole about the first twist axis T1, causing the output member 5 to move relative to the input member 4 with the aforementioned vector component V in the offset direction X. The transition segment G extends in a start orientation transverse to the output direction D2 and the offset direction X when the output member 5 is in the start position B1 and is tilted into an offset orientation oblique to the start orientation when the output member 5 is in the offset position B2.

Preferably, the first twist axis T1 is tangent to the circumferential surface 41 of the roller body 40 of the input member 4 and/or coincides or substantially coincides with the input path of the strip S. The tilting of the transition segment G about the first twist axis T1 mainly, predominantly or exclusively subjects the strip S to torsion about the first twist axis T1, along the input path, i.e. about the longitudinal axis of the strip S. In this way, bending, stretching or compression of the strip S at one of its longitudinal sides can be prevented.

To compensate for the angular component of the movement of the output member 5 about the first twist axis T1, the supply holder 30 is configured for progressively moving the input member 4 and the output member 5 apart in an extension direction E parallel to the transition direction D3 and/or perpendicular to the first twist axis T1, thereby introducing a radial component to the movement of the output member 5 relative to said first twist axis T1. The output member 5 can thus remain at the same level as the applicator member 2 despite the tilt about the first twist axis T1. In this specific example, the supply holder 30 comprises a first holder part 31 holding the input member 4 and a second holder part 32 holding the output member 5. The second holder part 32 is movable, preferably telescopically, with respect to the first holder part 31 in an extension direction E to move the input member 4 and the output member 5 away from each other. The extension may be actively controlled, i.e. pneumatically. Alternatively, another mechanism may be used to obtain the extension of the supply holder 30 in the extension direction E, i.e. a linear drive, a linkage or the like.

While the supply holder 30 and/or the transition segment G is tilted about the first twist axis T1, the output member 5 remains in-line with the applicator member 2 but is effectively rotated or tilted relative to said applicator member 2 about a second twist axis T2 tangent to the circumferential surface 51 of the output member 5 and the circumferential surface 21 of the applicator member 2. Said second twist axis T2 coincides or substantially coincides with the output path and/or is parallel or substantially parallel to the output direction D2. Again, this allows for the part of the strip S extending in said output path to be subjected mainly, predominantly or exclusively to torsion. In particular, the torsion in the strip S between the output member 5 and the applicator member 2 is opposite to the torsion upstream of the input member 4 so that the torsions substantially cancel each other out and the strip S is essentially in the same orientation upstream and downstream of the supply section 3.

Figure 5:
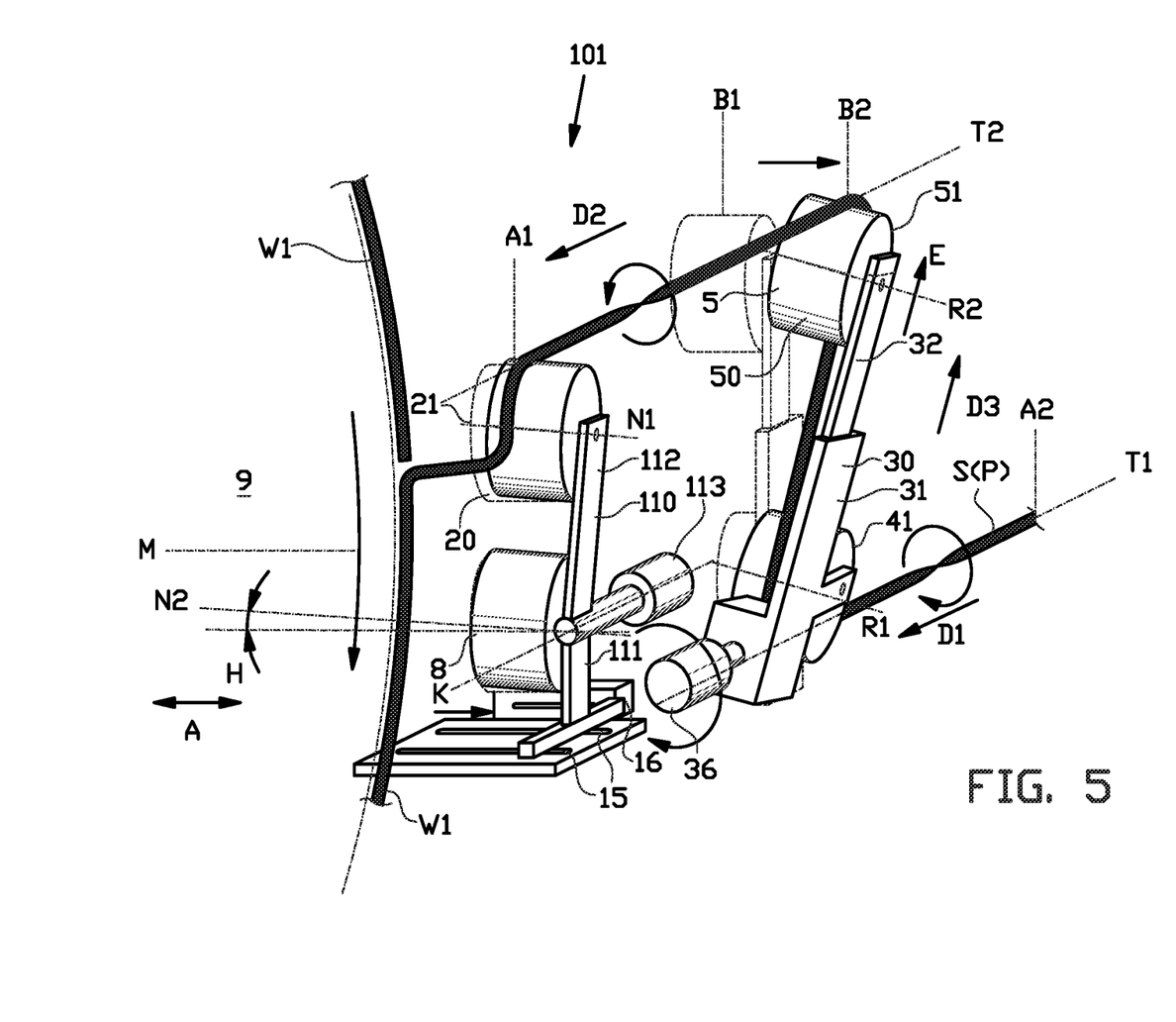
FIG. 5 shows an isometric view of an alternative strip applicator according to a second exemplary embodiment of the invention.

FIG. 5 shows an alternative strip applicator 101 according to a second exemplary embodiment of the invention that differs from the aforementioned strip applicator 1 in that the applicator member 2 can be rotated or tilted about a steering axis K transverse or perpendicular to the applicator axis N1, the drum axis M and/or the offset direction X. The applicator member 2 can be tilted between a neutral orientation, in which the applicator axis N1 extends parallel to the drum axis M, as shown in dashed lines, and a steering orientation in which the applicator axis N1 extends at a steering angle H oblique to the drum axis M, as shown in solid lines. In this exemplary embodiment, the applicator holder 110 is divided into a first holder part 111 and a second holder part 112 that is rotatable relative to the first holder part 111 about the steering axis K. The alternative strip applicator 101 further comprises a steering drive 113 for driving the rotation of the second holder part 112 about the steering axis K. In this exemplary embodiment, the steering axis K intersects with the stitcher axis N2. Alternatively, the steering axis K may be located closer to or at the applicator axis N1.

The steering angle H may be set prior to winding or may be varied during winding. The steering angle H can be used to steer the strip in into and out of the transition area between the windings or during the application of the windings themselves to exert a sideways force onto the strip S.

Figure 6:
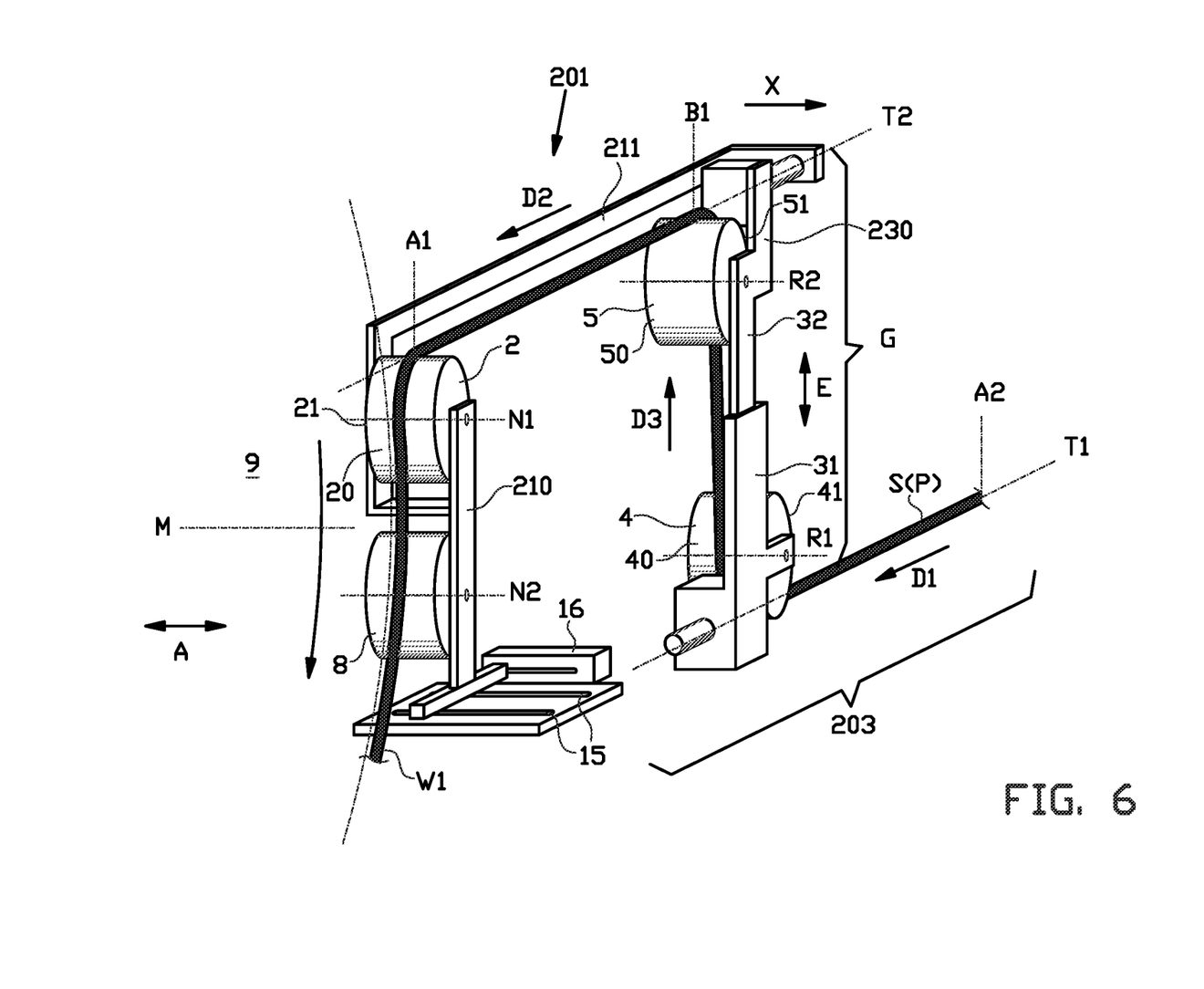
FIG. 6 shows an isometric view of a further alternative strip applicator according to a third exemplary embodiment.

FIG. 6 shows a further alternative strip applicator 201 according to a third exemplary embodiment of the invention, that differs from the aforementioned strip applicators 1, 101 in that applicator member 2 and the output member 5 are mechanically coupled and/or interconnected so as to move synchronously in the offset direction X. More in particular, the supply section 203 comprises a supply holder 230 that is mechanically interconnected with the applicator holder 210 by a connecting frame or a connecting member 211. Said connecting member 211 forces the output member 5 to follow the position of the applicator member 2 in the offset direction X. The supply holder 230 is hingably coupled to the connecting member 211 such that the supply holder 230 can rotate relative to the connecting member 211 about the second twist axis T2, i.e. in line or coinciding with the longitudinal axis of the strip S in the output direction D2. The supply holder 230 ensures that the input member 4 and the output member 5 assume the same tilted orientation as a result of the displacement of the applicator member 2 in the offset direction X.

In this alternative embodiment, there is no need for a supply drive. The positions of the input member 4 and the output member 5 are changed automatically as a result of the displacement of the applicator member 2 in the offset direction X by the applicator drive 16.

Moreover, the supply holder 230 can be telescopically extended as described before. However, the telescopic action of the supply holder 230 does not need to be driven actively, as the relative position between the output member 5 (coupled via the connecting member 211 to the applicator member 2) and the input member 4 can cause the supply holder 230 to follow and/or extent automatically or passively.

Figure 7:
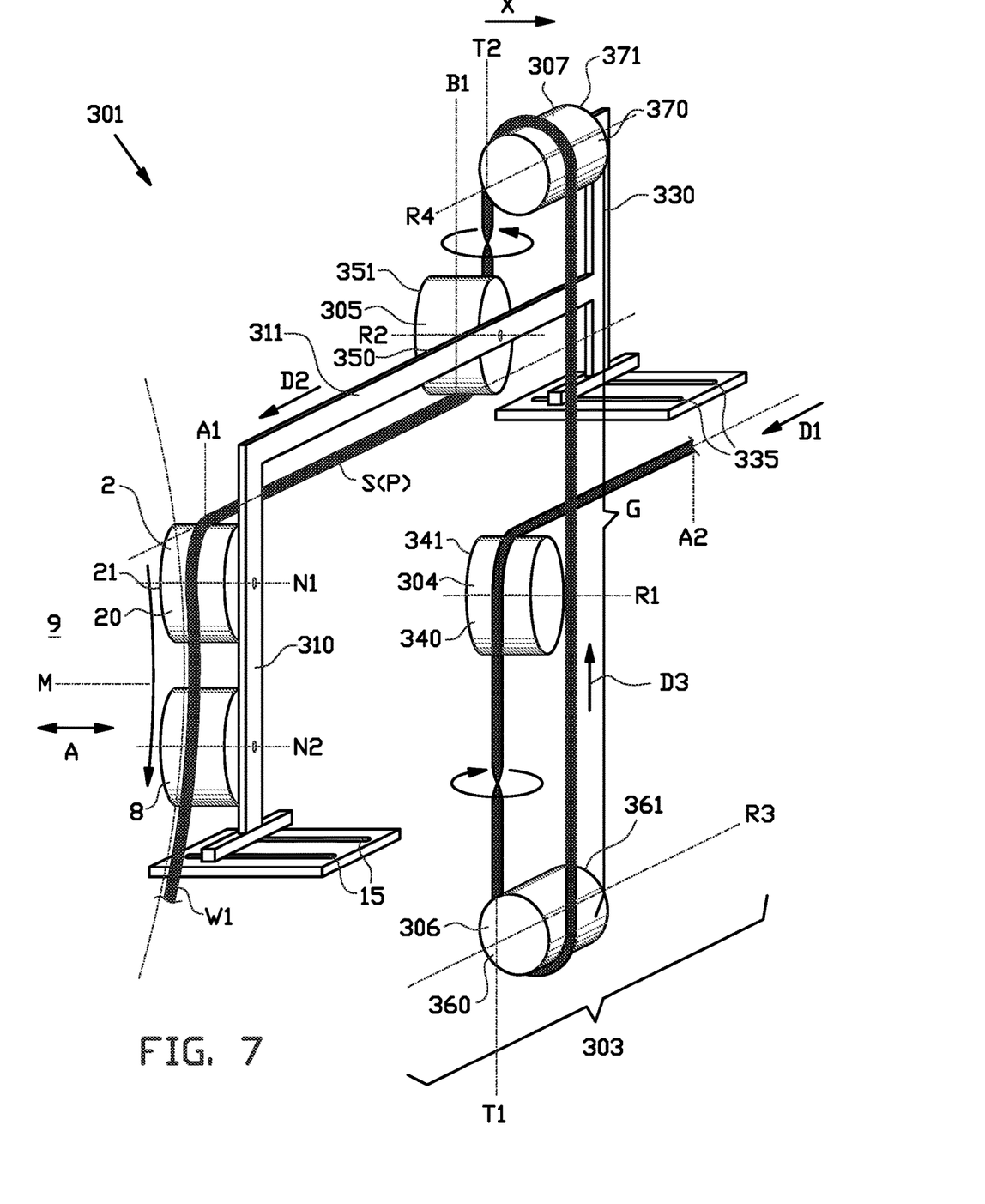
FIGS. 7 and 8 show isometric views of a further alternative strip applicator according to a fourth exemplary embodiment of the invention, during two subsequent stages of strip-winding.
Figure 8:
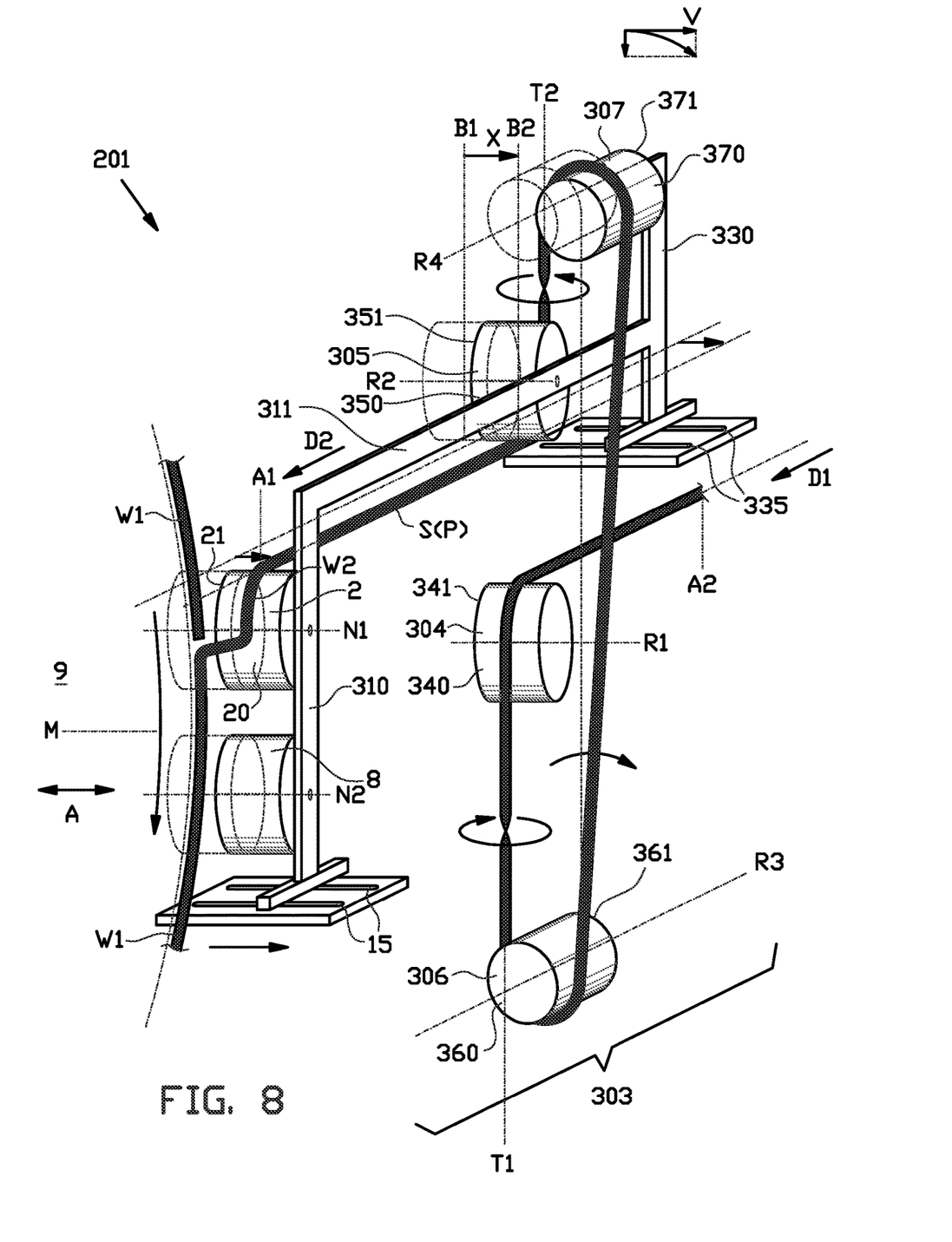

FIGS. 7 and 8 show a further alternative strip applicator 301 according to a fourth exemplary embodiment of the invention, that differs from the aforementioned strip applicators 1, 101, 201 in that its supply section 303 is designed to increase the length of the transition segment G, so that the same offset in the offset direction X can be created with a relatively small angular displacement of said transition segment G. Moreover, the strip S is twisted within the supply section 303, instead of upstream and downstream of said supply section 303.

To increase the length of the transition segment G, the supply section 303 comprises a first detour or diversion member 306 for receiving the strip S from the input member 304 and a second detour or diversion member 307 for feeding the strip S towards the output member 305. The first diversion member 306 is located at a side of the input member 304 facing away from the output member 305. The second diversion member 307 is located at a side of the output member 305 facing away from the input member 304. The transition segment G is defined between the first diversion member 306 and the second diversion member 307 and is therefore independent of the relatively positioning and/or distance between the input member 304 and the output member 305.

As shown in FIG. 7, the input member 304 comprises a roller body 340 with a circumferential surface 341 that is rotatable about an input axis R1. The input axis R1 is parallel or substantially parallel to the drum axis M, the axial direction A and/or the offset direction X. The output member 305 comprises a roller body 350 with a circumferential surface 351 that is rotatable about an output axis R2. In this example, the output axis R2 is parallel or substantially parallel to the input axis R1.

The first diversion member 306 comprises a roller body 360 with a circumferential surface 361 that is rotatable about a first diversion axis R3 transverse or perpendicular to the input axis R1 and/or the transition direction D3. The second diversion member 307 comprises a roller body 370 with a circumferential surface 371 that is rotatable about a second diversion axis R4 transverse or perpendicular to the output axis R2. In this example, the second diversion axis R4 is parallel or substantially parallel to the first diversion axis R3. The strip S can thus be twisted twice within the supply section 303, once between the input member 304 and the first diversion member 306 and again between the second diversion member 307 and the output member 305. The twists are in opposite directions, so that the torsions in the strip S can cancel each other out. Meanwhile, the strip S can be positioned optimally for entering into and exiting from the transition segment G without any significant stretching at the longitudinal sides of the strip S.

Comparing FIGS. 7 and 8, it can be seen that the second diversion member 307 and the output member 305 are linearly moved in the offset direction X with respect the input member 304 and the first diversion member 306, which remain fixed or stationary in said offset direction X. In particular, the further alternative strip applicator 301 comprises a supply holder 330 that holds both the input member 304 and the first diversion member 306, and that is linearly movable over a supply guide 335 in the offset direction X. The applicator holder 310 and the supply holder 330 may be integrally interconnected or mechanically interconnected, i.e. by a connecting frame or a connecting member 311, to synchronize the movements in the offset direction X. Alternatively, the further alternative strip applicator 301 may be provided with a supply drive (not shown) for actively driving or controlling the linear movement of the supply holder 330 in said offset direction X in a synchronized manner with the applicator member 2.

As a result of the linear movement of the second diversion member 307 relative to the first diversion member 306, the transition segment G is rotated or tilted about the first diversion axis R3 with at least a vector component V in the offset direction X. The length of the transition segment G may increase slightly, but stretching is kept to a minimum because of the relatively large radius of the transition segment G relative to the first diversion axis R3 and the relatively small tilt angle.

A method for applying the strip S to the strip-winding drum 9 with the use of the aforementioned strip applicator 1, 101, 201, 301 will now be briefly elucidated.

The strip S is first received into the strip applicator 1, 101, 201, 301 at the supply position A, and is subsequently guided through the supply section 3, 303 before it is ultimately supplied from the supply section 3, 303 to the applicator member 2 and applied to the strip-winding drum 9, optionally with the use of the stitcher member 8.

The strip S is wound around the strip-winding drum 9 over two or more windings W1, W2. When the first winding W1 is almost completed, the applicator member 2 is quickly moved in the offset direction X to offset the application position A1 relative to the supply position A2. As a result, the strip S travels through a small transition area from the first winding W1 to the second winding W2, as shown in FIGS. 3 and 8, before continuing in the second winding W2, as shown in FIG. 4. The output member 5, 305 is moved simultaneously with the applicator member 2 relative to the input member 4, 304 from the start position B1, as shown in FIGS. 2 and 7, towards the offset position B2, as shown in FIGS. 3 and 8. The part of the strip S between the output member 5, 305 and the applicator member 2 can thus be kept in-line or substantially in-line with each other, while the strip S is mainly subjected to torsion instead of stretch or compression.

When the strip S has transitioned into the second winding W2, the strip-winding drum 9 can play catch-up by slowly moving in the offset direction X, while the applicator member 2 and the output member 5, 305 are returned at the same speed in a return direction Y opposite to the offset direction X. After returning to their initial positions, the strip applicator 1, 101, 201, 301 is ready for another quick offset in the offset direction X. If timed correctly, the strip-winding drum 9 can be moved at a constant slow speed, i.e. without interruption, while the strip applicator 1, 101, 201, 301 alternates between quick transitions and slow returns.

Figure 9A:
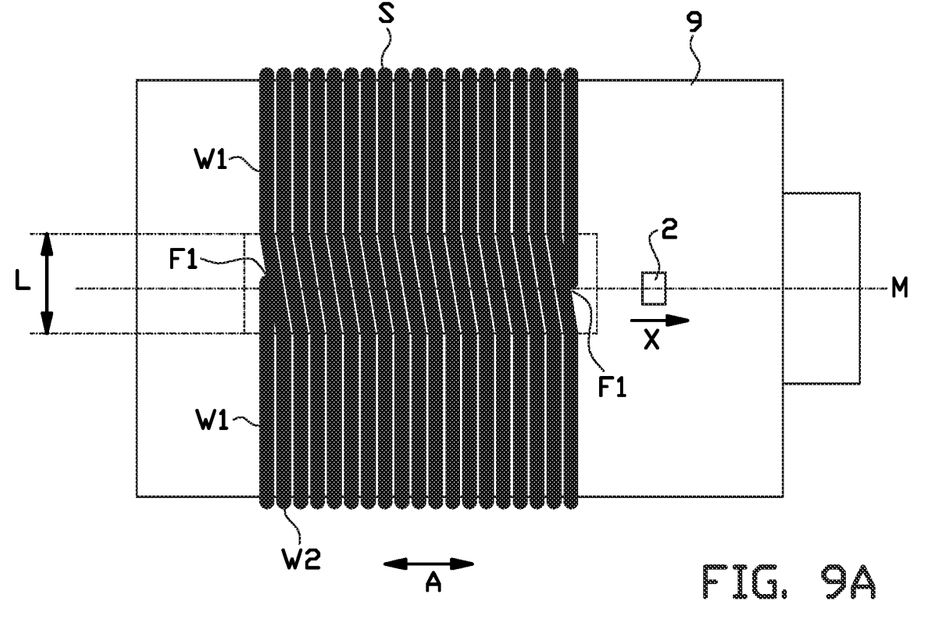
FIGS. 9A and 9B show two different options of a method for applying a strip to a strip-winding drum.
Figure 9B:
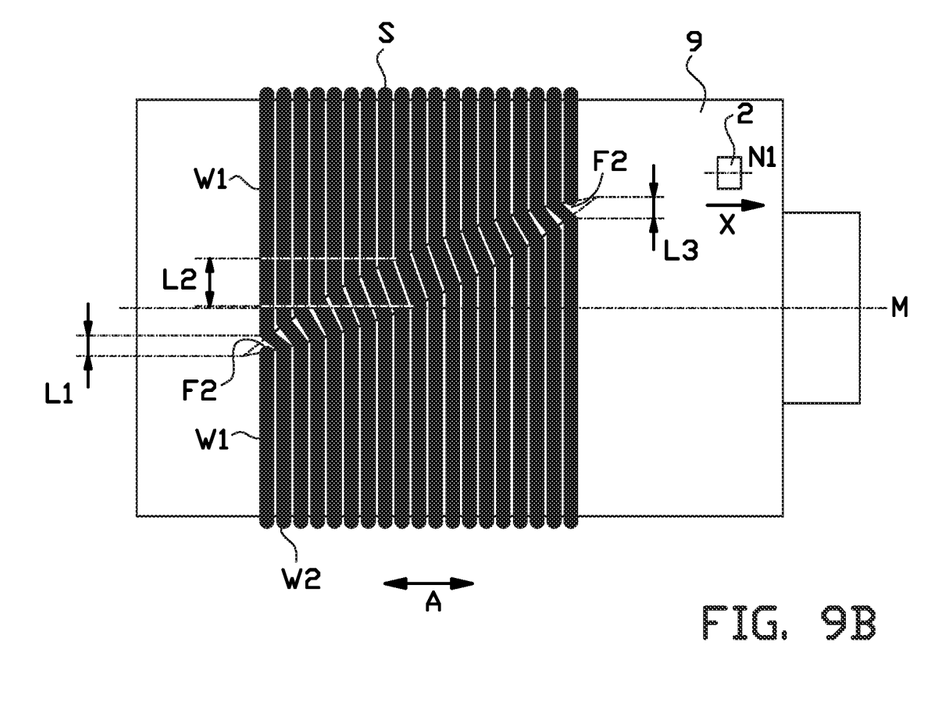

FIGS. 9A and 9B show different options for controlling the behavior of the applicator member 2 relative to the strip-winding drum 9 to obtain transitions between windings W1, W2.

FIG. 9A shows a situation in which each transition of the strip S from one winding W1 to the next winding W2 is constant. In other words, the applicator member 2 is moved in the offset direction X at with an offset speed in a constant ratio to the rotation speed of the strip-winding drum 9. Hence, the shape, pitch, orientation and/or length of the strip S in the transition area between each pair winding W1, W2 is constant. This results in a substantially constant, overall transition area Z1 across the strip-winding drum 9 in which each transition has substantially the same length L in the circumferential direction, as indicated with dimensional arrow L. Also each transition starts and ends at the same angular position in the circumferential direction. This strategy leaves relatively large gaps F1 in the outer windings W1, W2.

FIG. 9B shows a situation in which the ratio between the offset speed of the applicator member 2 and the rotation speed of the strip-winding drum 9 is varied between subsequent pairs of windings W1, W2 to obtain a variable, overall transition area Z2. In particular, the offset speed of the applicator member 2 in the offset direction X may be increased or decreased while the rotation speed of the strip-winding drum 9 remains constant. Consequently, the transition area Z2 formed by said variable ratio is not constant. In this example, the offset speed of the applicator member 2 is relatively high compared to the rotation speed of the strip-winding drum 9 for the outer windings in the axial direction A and is decreased towards more central windings W1, W2, to obtain a relatively short transition area, as indicated with dimensional arrows L1, L3, at the outer windings and a relatively long transition area, as indicated with dimensional arrow L2, at the central windings W1, W2. This results in the overall transition area Z2 having the shape of an ellipse, a pointed ellipse or a Vesica Piscis.

Moreover, subsequent transitions can be shifted slightly with respect to each other in the circumferential direction such that the overall transition area Z2 extends obliquely or helically along the circumference of the strip-winding drum 9. This allows for the transitions to be nested closer together. As a result, the angle of the transition areas at the outer windings W1, W2 can be much sharper and the resulting gaps F2 at said outer windings W1, W2 much smaller.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, it will be appreciated that more components may be introduced in the strip applicators 1, 101, 201, 301 for guiding the strip S along a different strip path P. In particular, one or more additional roller bodies may be provided within supply path P at the transition segment G. Consequently, the transition segment G is not necessarily linear.

Moreover, a different type of applicator member, input member, output member or diversion member may be selected, i.e. from the group comprising brush rollers, crowned rollers, conveyors, belt conveyors, or the like.

LIST OF REFERENCE SIGNS 1 strip applicator
10 applicator holder
15 applicator guide
16 applicator drive
2 applicator member
20 roller body
21 circumferential surface
3 supply section
30 supply holder
31 first holder part
32 second holder part
36 supply drive
4 input member
40 roller body
41 circumferential surface
5 output member
50 roller body
51 circumferential surface
8 stitch member
9 strip-winding drum
100 strip-winding station
101 alternative strip applicator
110 applicator holder
111 first holder part
112 second holder part
113 steering drive
201 further alternative strip applicator
210 applicator holder 211 connecting member
203 supply section
230 supply holder
301 further alternative strip applicator
310 applicator holder
311 connecting member
303 supply section
330 supply holder
335 supply guide
336 supply drive
304 input member
340 roller body
341 circumferential surface
305 output member
350 roller body
351 circumferential surface
306 first diversion member
360 roller body
361 circumferential surface
307 second diversion member
370 roller body
371 circumferential surface
A axial direction
A1 application position
A2 supply position
B1 start position
B2 offset position
D1 input direction
D2 output direction
D3 transition direction E extension direction
F1 gap
F2 gap
G transition segment
H steering angle
K steering axis
L length of the transition area
L1 length of the transition area
L2 length of the transition area
L3 length of the transition area
M drum axis
N1 applicator axis
N2 stitch axis
P supply path
R1 input axis
R2 output axis
R3 first diversion axis
R4 second diversion axis
S strip
T1 first twist axis
T2 second twist axis
V vector component
W1 first winding
W2 second winding
X offset direction
Y return direction
Z1 overall transition area
Z2 overall transition area

The invention claimed is:

1. A strip applicator for applying a strip to a strip-winding drum for forming a tire component, wherein the strip applicator comprises an applicator member for applying the strip to the strip-winding drum at an application position and a supply section for receiving the strip in an input direction at a supply position and for supplying the strip to the applicator member in an output direction, wherein the applicator member is movable in an offset direction transverse to the output direction to offset the application position relative to the supply position, wherein the supply section comprises an input member at the supply position for receiving the strip in the input direction and an output member for outputting the strip to the applicator member in the output direction, wherein the output member is movable relative to the input member from a start position towards an offset position with at least a vector component in the offset direction, wherein the supply section defines a supply path for the strip, wherein the supply path, between the input member and the output member, comprises a transition segment that extends in a start orientation transverse to the output direction and the offset direction when the output member is in the start position and that is tilted into an offset orientation oblique to the start orientation when the output member is in the offset position, wherein the transition segment is tiltable about a first twist axis parallel to the input direction, wherein the input member and the output member are tiltable as a whole about the first twist axis.

2. The strip applicator according to claim 1, wherein the output member is arranged to remain aligned with the applicator member in the output direction when the output member is moved from the start position towards the offset position.

3. The strip applicator according to claim 1, wherein the output member and the applicator member are synchronously movable in the offset direction.

4. The strip applicator according to claim 1, wherein the strip applicator comprises an applicator holder for holding the applicator member, wherein the supply section comprises a supply holder for holding the output member, wherein the applicator holder and the supply holder are mechanically interconnected to synchronize the movements of the applicator member and the output member in the offset direction.

5. The strip applicator according to claim 1, wherein the transition segment extends in a transition direction transverse or perpendicular to the offset direction and the output direction in the start orientation.

6. The strip applicator according to claim 1, wherein the input member comprises a roller body with a circumferential surface, wherein the first twist axis is tangent to the circumferential surface of the roller body of the input member.

7. The strip applicator according to claim 6, wherein the input member is arranged for receiving the strip in the input direction along an input path, wherein the first twist axis coincides with the input path.

8. The strip applicator according to claim 1, wherein the output member comprises a roller body with a circumferential surface and wherein the applicator member comprises a roller body with a circumferential surface, wherein the output member is tiltable relative to the applicator member about a second twist axis tangent to the circumferential surface of the output member and the circumferential surface of the applicator member.

9. The strip applicator according to claim 1, wherein the supply section comprises a supply holder for holding the input member and the output member relative to the first twist axis, wherein the supply holder, the input member and the output member are tiltable as a whole about the first twist axis.

10. The strip applicator according to claim 9, wherein the supply holder comprises a first holder part holding the input member and a second holder part holding the output member, wherein the second holder part is movable with respect to the first holder part in an extension direction to move the input member and the output member away from each other.

11. The strip applicator according to claim 10, wherein the second holder part is telescopically movable with respect to the first holder part in said extension direction.

12. The strip applicator according to claim 10, wherein the extension direction extends perpendicular or transverse to the first twist axis.

13. The strip applicator according to claim 1, wherein the supply section comprises a first diversion member for receiving the strip from the input member and a second diversion member for feeding the strip towards the output member, wherein the transition segment is defined between the first diversion member and the second diversion member.

14. The strip applicator according to claim 13, wherein the first diversion member is located at a side of the input member facing away from the output member or wherein the second diversion member is located at a side of the output member facing away from the input member.

15. The strip applicator according to claim 13, wherein the input member comprises a roller body with a circumferential surface that is rotatable about an input axis and wherein the first diversion member comprises a roller body with a circumferential surface that is rotatable about a first diversion axis transverse or perpendicular to the input axis.

16. The strip applicator according to claim 15, wherein the output member comprises a roller body with a circumferential surface that is rotatable about an output axis and wherein the second diversion member comprises a roller body with a circumferential surface that is rotatable about a second diversion axis transverse or perpendicular to the output axis.

17. The strip applicator according to claim 16, wherein the first diversion axis and the second diversion axis are parallel to each other.

18. The strip applicator according to claim 13, wherein the first diversion member comprises a roller body with a circumferential surface that is rotatable about a first diversion axis, wherein the transition segment is tiltable about the first diversion axis.

19. The strip applicator according to claim 13, wherein the second diversion member and the output member are linearly movable in the offset direction.

20. The strip applicator according to claim 1, wherein the input member comprises a roller body with a circumferential surface that is rotatable about an input axis and wherein the output member comprises a roller body with a circumferential surface that is rotatable about an output axis parallel to the input axis.

21. The strip applicator according to claim 1, wherein the input direction and the output direction are parallel.

22. The strip applicator according to claim 1, wherein the applicator member is linearly movable in the offset direction.

23. The strip applicator according to claim 1, wherein the applicator member comprises a roller body with a circumferential surface that is rotatable about an applicator axis, wherein the orientation of the applicator axis remains fixed during the movement of the applicator member in the offset direction.

24. A strip-winding station comprising the strip applicator according to claim 1 and a strip-winding drum.

25. The strip-winding station according to claim 24, wherein the strip-winding drum is rotatable about a drum axis, wherein the offset direction is parallel to the drum axis.

26. The strip-winding station according to claim 24, wherein the applicator member comprises a roller body with a circumferential surface that is rotatable about an applicator axis, wherein the applicator member is rotatable about a steering axis transverse to the applicator axis between a neutral orientation in which the applicator axis extends parallel to the drum axis and a steering orientation in which the applicator axis extends at a steering angle oblique to the drum axis.

27. A method for applying a strip to a strip-winding drum using the strip applicator according to claim 1, wherein the method comprises the steps of:
  receiving the strip in the input direction into the supply section at the supply position;
  supplying the strip from the supply section to the applicator member in the output direction;
  applying the strip to the strip-winding drum at the application position by winding the strip around the strip-winding drum over two or more windings;
  moving the applicator member in the offset direction transverse to the output direction to offset the application position relative to the supply position; and
  moving the output member relative to the input member from the start position towards the offset position with at least a vector component in the offset direction.

28. The method according to claim 27, wherein the output member remains aligned with the applicator member in the output direction when the output member is moved from the start position towards the offset position.

29. The method according to claim 27, wherein the output member and the applicator member move synchronously in the offset direction.

30. The method according to claim 27, wherein the strip is subjected to a torsion in a position between the output member and the applicator member as a result of moving the output member in the offset direction.

31. The method according to claim 30, wherein the strip is subjected to a torsion opposite to the torsion between the output member and the applicator member in a position upstream of the input member with respect to the input direction.

32. The method according to claim 27, wherein the strip is subjected to opposite torsions in two spaced apart positions between the input member and the output member.

33. The method according to claim 27, wherein the applicator member comprises a roller body with a circumferential surface that is rotatable about an applicator axis, wherein the method further comprises the step of rotating the applicator member about a steering axis transverse to the applicator axis between a neutral orientation in which the applicator axis extends parallel to the drum axis and a steering orientation in which the applicator axis extends at a steering angle oblique to the drum axis.

34. The method according to claim 27, wherein the method further comprises the steps of:
  moving the strip-winding drum in the offset direction; and
  simultaneously returning the applicator member and the output member in a return direction opposite to the offset direction.

35. The method according to claim 27, wherein the applicator member is moved in the offset direction at an offset speed in a ratio to a rotation speed of the strip-winding drum about the drum axis, wherein the method further comprises the step of:
  varying the ratio for subsequent pairs of windings of the strip.

* * * * *